(12) United States Patent
Hosking

(10) Patent No.: US 6,425,233 B1
(45) Date of Patent: Jul. 30, 2002

(54) FRUIT SHAKER

(76) Inventor: John Hosking, 451 Sunset Drive, Oakville, Ontario (CA), L6L 3N3

(*) Notice: Subject to any disclaimer, the term of this patent is extended or adjusted under 35 U.S.C. 154(b) by 0 days.

(21) Appl. No.: 09/725,231

(22) Filed: Nov. 29, 2000

(51) Int. Cl.[7] .............................................. A01D 46/00
(52) U.S. Cl. ...................... 56/328.1; 56/11.9; 56/330
(58) Field of Search ............................... 56/328.1, 329, 56/330, 331, 340.1, 11.9, 124, DIG. 11; 460/123, 133, 134

(56) References Cited

U.S. PATENT DOCUMENTS

| | | | | |
|---|---|---|---|---|
| 3,561,205 A | * | 2/1971 | Baker ......................... | 56/328.1 |
| 3,713,282 A | * | 1/1973 | Baker ......................... | 56/328.1 |
| 3,864,899 A | * | 2/1975 | Lasswell .................... | 56/328.1 |
| 5,042,225 A | * | 8/1991 | Drury et al. ................. | 53/211 |
| 5,428,947 A | * | 7/1995 | Visser ......................... | 56/328.1 |
| 5,916,115 A | * | 6/1999 | Pavone ....................... | 56/328.1 |
| 5,946,896 A |   | 9/1999 | Daniels | |
| 6,012,276 A | * | 1/2000 | Walker et al. ................ | 56/330 |

* cited by examiner

Primary Examiner—Thomas B. Will
Assistant Examiner—Nathan Mammen
(74) Attorney, Agent, or Firm—Ingrid E. Schmidt

(57) ABSTRACT

A fruit removal assembly forming part of a mobile fruit harvester has a single motor for orbiting two pairs of oppositely disposed panels to which are mounted a plurality of longitudinally extending fingers which penetrate a fruit tree canopy and dislodge fruit. The motor is coupled to the panels by a mechanical drive and thereby provides for synchronized simultaneous movement of the panels. The panels are coupled to a structural frame for supporting the panels and tethers fixed to an anchor positioned to space the tethers from the structural frame at an intermediate portion between the panels and the structural frame are provided to align the panels and mitigate the occurrence of collisions between orbiting panels.

9 Claims, 4 Drawing Sheets

FRUIT SHAKER

FIELD OF THE INVENTION

This invention relates to a fruit harvester, and particularly to a harvester having orbiting assemblies of fingers or wands which are inserted into the canopy of a fruit tree to dislodge the fruit.

BACKGROUND OF THE INVENTION

In one known fruit harvester described in part in U.S. Pat. No. 5,946,896 to Daniels, four oscillating fruit removal heads are mounted on a common frame which is positioned where desired by an articulated telescoping boom carried on a wheeled chassis which can be navigated between rows of fruit trees. The fruit removal heads each have a plurality of agitation wands which, in use, extend into the canopy of the fruit tree and dislodge the fruit. The oscillation heads are each mounted eccentrically with respect to a drive shaft rotated by pressurized hydraulic fluid fed to a respective motor from a central hydraulic power unit carried on the chassis. The hydraulic power units and each corresponding motor are operatively coupled in fluid communication through a series of hydraulic supply lines and hydraulic return lines.

Tethers are provided to restrain the oscillating fruit removal heads from contacting or engaging each other and the direction of movement of each oscillating fruit removal head is selected to balance the opposing movement of the other fruit removal heads in order to stabilize the fruit removal assembly. Despite such precautions, the Daniels harvester suffers from a lack of synchronization and this has some rather unfortunate consequences which have contributed to making the harvester somewhat less desirable than it could be.

This invention provides alternative drive means for orbiting the fruit removal heads or panels and alignment means for coupling the fruit removal heads or panels to a structural frame for supporting the panels which are intended to alleviate the aforementioned synchronization problems.

SUMMARY OF THE INVENTION

The invention is part of a fruit harvester, specifically, a fruit removal assembly. The fruit removal assembly has four panels with a plurality of fingers that extend into a fruit tree canopy when in use. The panels are supported by a structural frame, which in turn is connected to a positioning arm mounted on a vehicle that can be driven through an orchard. In operation, the fruit removal assembly is mechanically driven by a single hydraulic motor. An anchor bar is also attached to the structural frame, but spaced from the frame by support members, such that the anchor bar is equidistant between the panels and intermediate between the structural frame and the panels. A series of tethers span between the anchor bar and the panels, two per panel. These tethers function to restrain the movement of the panels, thereby preventing contact between the panels during operation of the fruit harvester.

BRIEF DESCRIPTION OF DRAWINGS

In order that the invention may better be understood, a preferred embodiment is described with reference to the accompanying drawings, in which.

DETAILED DESCRIPTION OF THE PREFERRED EMBODIMENT

Figure 1:
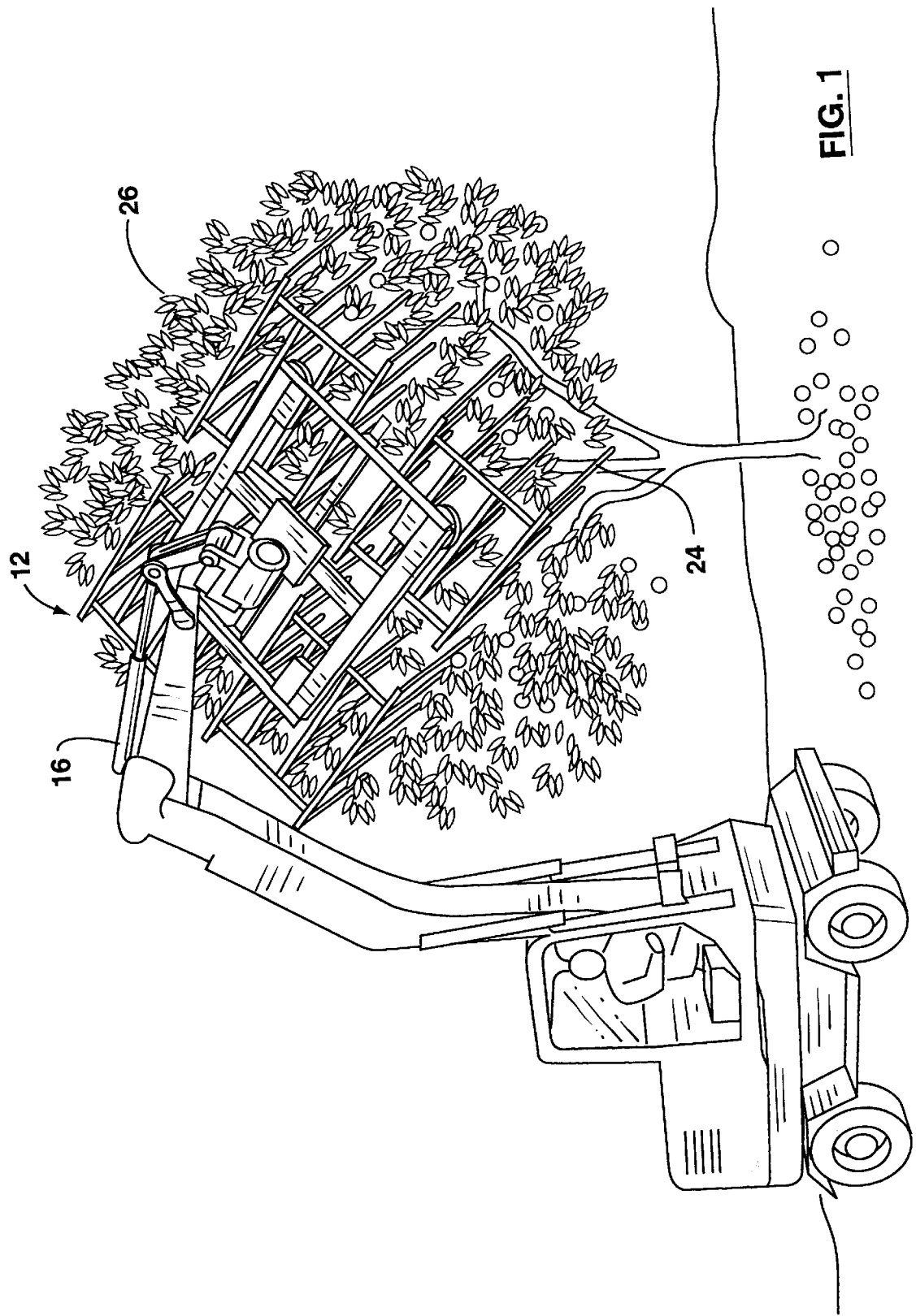
FIG. 1 is a perspective view of a fruit harvester in operation in an orchard showing a fruit removal assembly in a fruit tree canopy and the fruit harvester mounted on a vehicle.

A fruit removal assembly in accordance with the invention, is generally indicated by reference numeral 12 in the accompanying drawings. The fruit removal assembly 12 has a structural frame 14 coupled to a positioning means 16. The structural frame 14 supports a single hydraulic motor 18 and two pairs of oppositely disposed panels 20 mounted eccentrically via hub assemblies 22, of which one is shown in FIG. 4.

Figure 2:
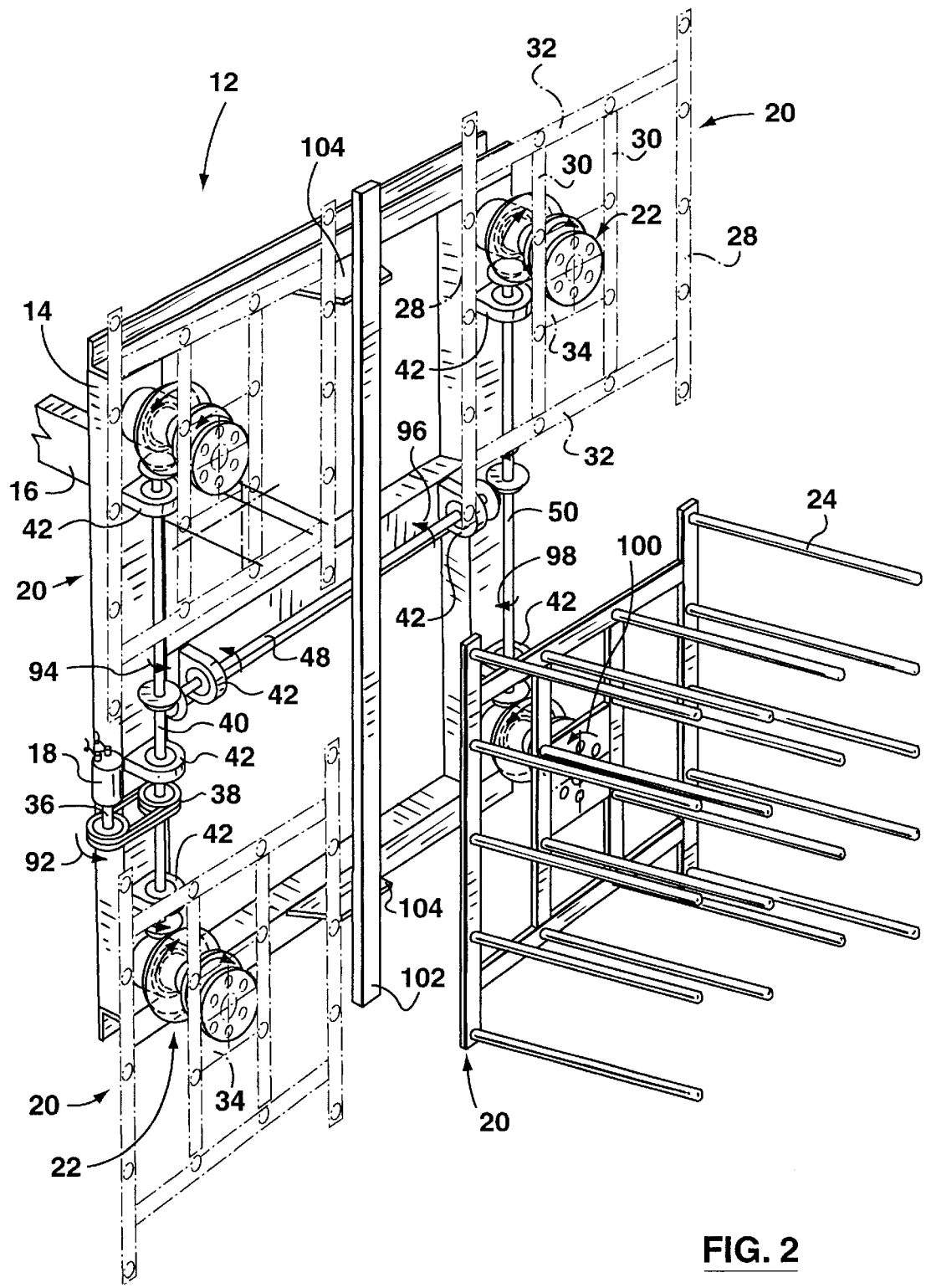
FIG. 2 is a perspective view of a fruit removal assembly forming part of a fruit harvester (not shown)
Figure 3:
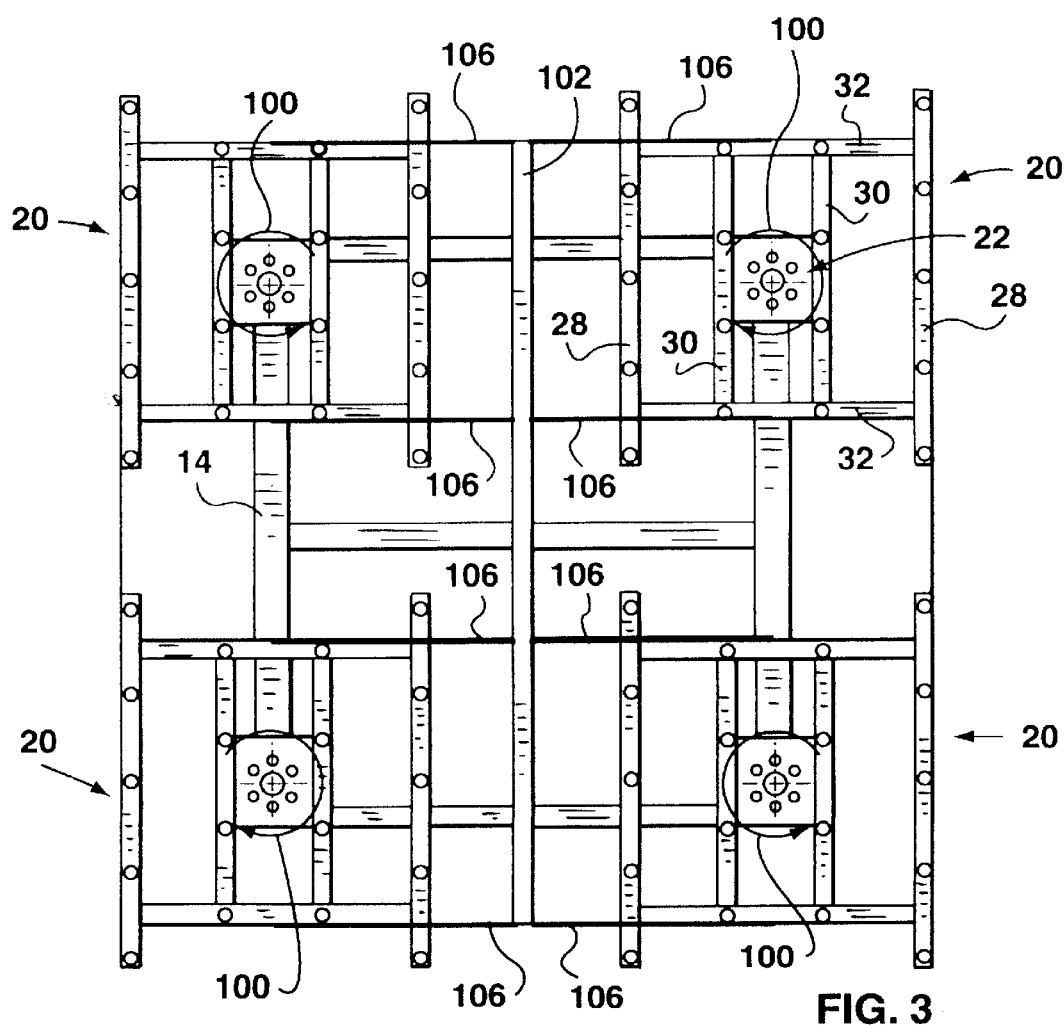
FIG. 3 is a front elevation view of the fruit removal assembly of FIG. 2.

Each panel 20 carries a plurality of longitudinally extending fingers 24 that penetrate a fruit tree canopy 26 when in use as shown in FIG. 1. As shown in FIGS. 1, 2, and 3, these panels 20 are comprised of four parallel members 28,30 at right angles to two connecting members 32 disposed at opposite ends of the parallel members 28, 30. The outer two parallel members 28 extend beyond the junction with the connecting members 32, while the inner two members 30 span the distance between the connecting members 32.

Each hub assembly 22 is attached to a panel 20 by a mounting plate 34. The panels 20 are driven by the motor 18 as follows: an output shaft 36 from the motor 18 is coupled by a loop drive 38, to a first output drive shaft 40 that is parallel to the output shaft 36 and is attached to the structural frame by three supports 42. The details of the supports 42 can be seen in FIG. 4 and are comprised of a ring bearing 44 and a seal 46. The first output drive shaft 40 is coupled to a linking drive shaft 48 at right angles to it, held in place with two supports 42. This linking drive shaft 48 is coupled to a second output drive shaft 50, which is parallel to the first output drive shaft 40 and is also attached to the frame by two supports 42. The hub assemblies 22 are coupled to the respective output drive shafts 40, 50 by bevel gears 52, only one of which is shown in FIG. 4.

Figure 4:
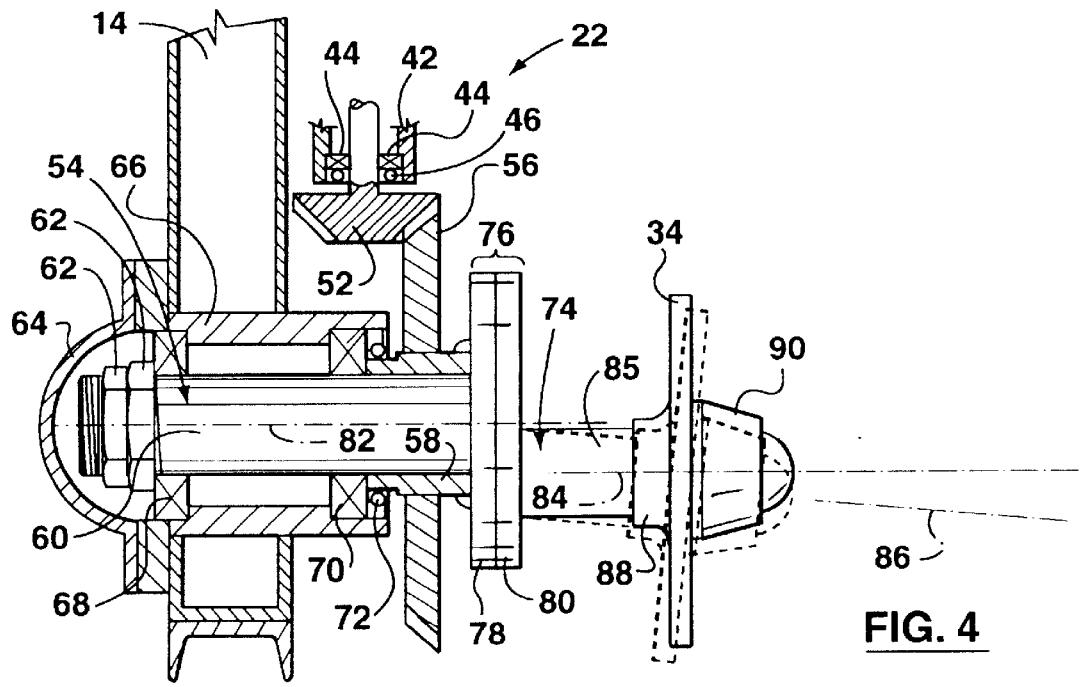
FIG. 4 is a detail partly sectioned view of a portion of a drive assembly showing the coupling between a primary hub and secondary hub associated with a panel forming part of the fruit removal assembly.

As best shown in FIG. 4, the bevel gear 52 engages with a gear 56 mounted to a ring mount 58 on spindle 60 of the primary hub 54.

The hub assemblies 22 are located on the structural frame and their spindles 60 are retained by two nuts 62 on the proximal end of the spindles 60 of the primary hubs 54. Each spindle is protected by a cover plate 64 and a housing 66 through which the spindle 60 of the primary hub 54 extends. Proximal bearings 68 and distal bearings 70 are located at the ends of the housing 66 and the unit is sealed with a seal 72. Each spindle 60 is attached to a secondary hub 74 by a coupler 76 having an inner plate 78 fixed to an outer plate 80, such that a longitudinal axis 82 of spindle 60 of the primary hub 54 is offset from a longitudinal axis 84 of a spindle 85 of the secondary hub 74. The axes are not necessarily parallel to one another as shown in the ghost outline 86. Each of the secondary hubs 74 is attached to a respective panel 20 by one of the mounting plates 34 having a sleeve 88 mounted to the spindle 85 and an outer bearing 90.

The fruit removal assembly 12 is carried by a vehicle that can move through an orchard between the trees. The positioning means 16 is usually an articulating arm mounted on a vehicle that permits the operator to position the panels 20 in the canopy of the fruit tree 26, such that the fingers 24 penetrate the canopy. During operation, rotation of the various drive shafts 40, 42, 48 as shown by arrows 92, 94, 96, 98 is coupled to rotation of the spindle 60 of the primary hubs 54, via the bevel gears 52, resulting in eccentric orbital motion of the secondary hubs 74 and associated panels 20 as shown by arrows 100 in FIG. 2 and 3. This directly drives the orbital motion of the fingers 24 which results in the fruit being knocked from the tree. The fruit can then be collected on an apron or any suitable collection device.

A single motor 18 drives the four panels 20 via a mechanical drive means in the form of a series of chain, drive shafts and gears. Thus, the above fruit removal assembly simplifies the method of powering the movement of the panels 20, as described in the prior art (U.S. Pat. No. 5,946,896), by reducing the number of motors to one and removing all but one hydraulic circuit. A more significant advantage is the elimination of the hydraulic distribution system between the main hydraulic line and the motor. This removes a source of asynchronous movement, as the hydraulic lines are notoriously prone to bleeding and the flow of hydraulic fluid from a single source cannot accurately be distributed between the hydraulic lines to ensure that equal power is applied to each of the panels. The mechanical drive means described herein promotes synchronization of the panels 20 and retention of a substantial amount of the dynamic motion within the structural frame 14.

Figure 5:
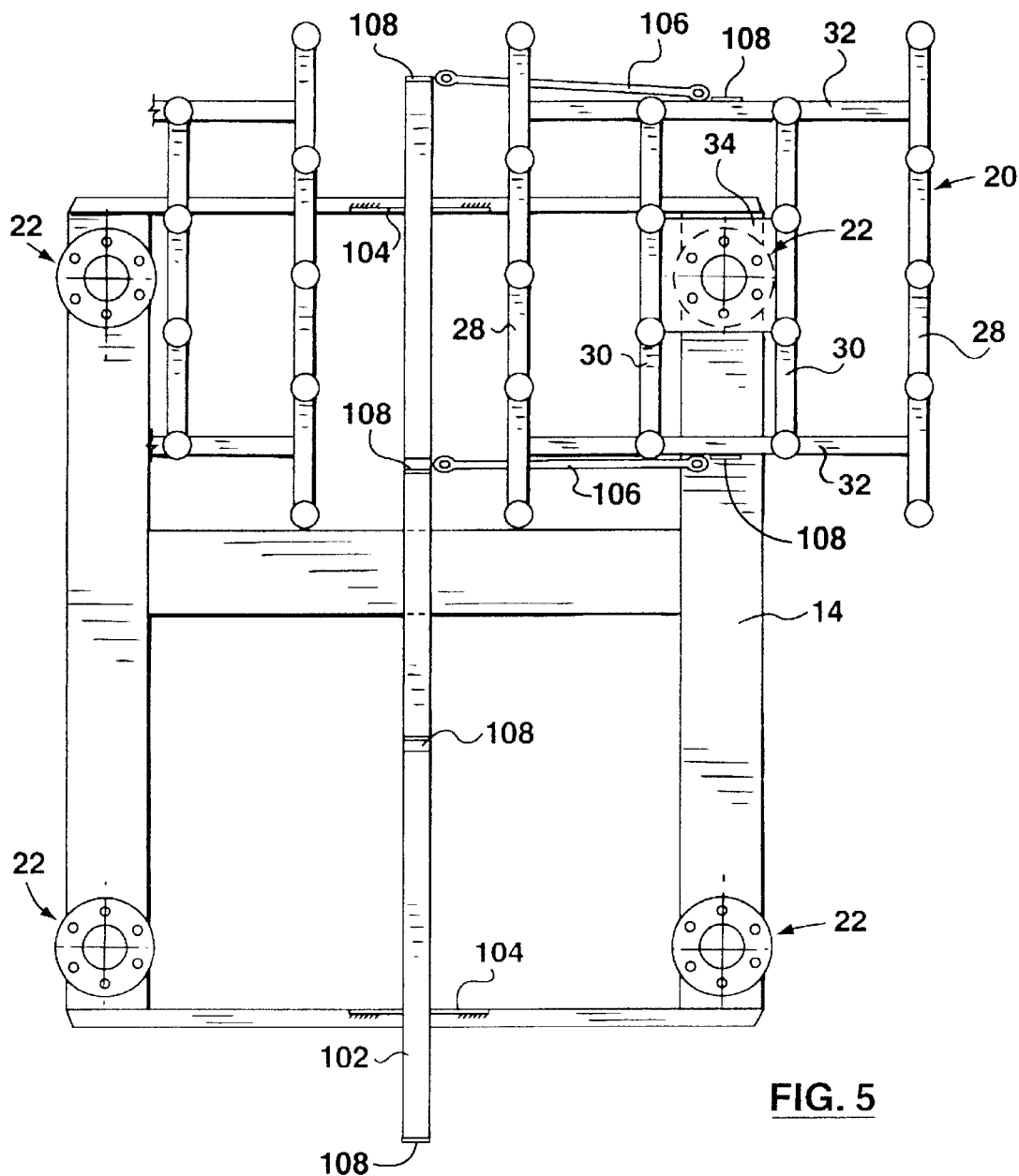
FIG. 5 is a similar view to FIG. 3 showing an anchor bar for retaining tethers to couple panels to a structural frame.
Figure 6:
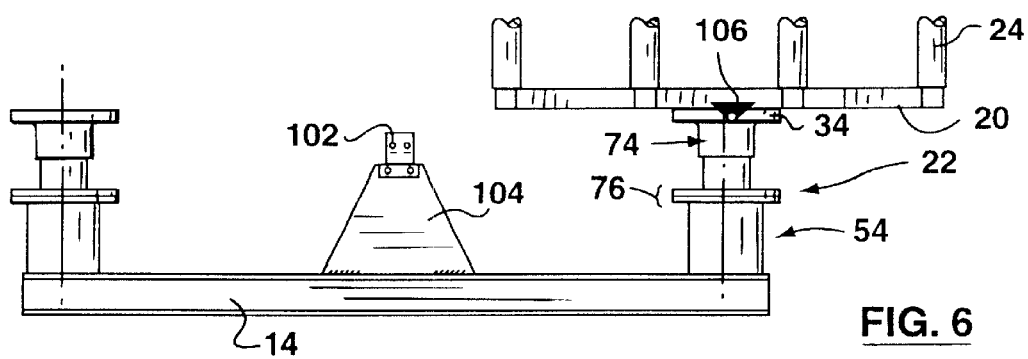
FIG. 6 is an end elevation view drawn on 5—5 of FIG. 5.

A further aspect of this invention is described wherein an anchor bar 102 is attached to the structural frame 14, by two support members 104 attached to the structural frame 14 as shown in FIG. 5. The anchor bar 102 and the panels 20 lie on the same side of the structural frame 14. The position of the anchor bar 102 can be further defined as being intermediate between the structural frame 14 and the panels 20 and being equidistant from said pairs of panels 20.

Another feature of the invention is the attachment of tethers 106 between the anchor bar 102 and the panels 20, a plurality of anchoring means 108 being present on the anchor bar 102 and the panels 20, as best shown in FIG. 5. Each tether 106 is attached at one end to the midpoint of the connecting members 32 and at the other end to the anchor bar 102, such that there are eight tethers 106 affixed in this manner.

During operation, rotation of the panels 20 is restrained and synchronized by the combination of the anchor bar 102 and tethers 106, such that excess movement of the panels 20 is dampened, and more importantly, opposing panels 20 do not contact each other. This is accomplished by attaching the tethers 106 to the anchor bar 102 which is strategically placed, by means of the support members 104 to be as close to the panels 20 as possible without impeding the movement of said panels 20. Again, this overcomes a serious defect in the prior art, whereby tethers to restrain the oscillating heads have proven to not stabilize the heads adequately. This is because they span between the panels and the structural frame directly with no anchor bar 102 to locate them.

The advantage of this invention will now be readily apparent to a person skilled in the art from the foregoing description of a preferred embodiment and its uses. Other embodiments and uses of this fruit removal assembly in accordance with the invention will also now be readily apparent. For example, a system of gears, sprockets or roller chains or alternatively bevel gears and shafts may drive the spindle of each of the primary hubs so that the adjacent primary hub spindle will rotate in opposite directions and diametrically opposite hub spindles will rotate in the same direction, the motion of the panels being restrained by tethers that are elastomers.

What is claimed is:

1. In a fruit harvester having a fruit removal assembly operatively connected to positioning means for positioning the fruit removal assembly at a desired location adjacent a fruit tree canopy, the fruit removal assembly having a structural frame coupled to said positioning means, the structural frame supporting two pairs of oppositely disposed panels each mounted eccentrically for relative orbital movement relative to the structural frame and each carrying a plurality of longitudinally extending fingers adapted to penetrate a fruit tree canopy, the improvement in which a single motor is provided for rotating all said panels, the motor being coupled by mechanical drive means to each of four primary hubs, each primary hub being rotatably coupled to said structural frame and having a respective secondary hub eccentrically fixed thereto, each said panels being fixed to a respective said secondary hub so that operation of the motor causes each of the panels to orbit eccentrically with respect to a respective primary hub simultaneously.

2. Fruit harvester according to claim 1 in which said mechanical drive means comprises a loop drive coupled at one end to an output shaft from the motor, a first drive shaft coupling a first pair of said panels and coupled to another end of said loop drive, a second drive shaft coupling a second pair of said panels, and a linking drive shaft coupling said first and second drive shafts.

3. Fruit harvester according to claim 2 in which the linking drive shaft has a pair of bevel gears disposed at opposite ends of the linking drive shaft, said bevel gears cooperating with respective bevel gears disposed on each said first and-second drive shafts between respective ends thereof each having a bevelled gear for coupling to a primary hub.

4. Fruit harvester according to claim 1 which includes an anchor bar coupled to said structural frame and extending longitudinally so as to be equidistant from said pairs of panels, the anchor bar and the panels all lying on one side of said structural frame and the anchor bar having spacing means for spacing the anchor bar from the structural frame by a distance intermediate the distance separating the panels from the structural frame, the anchor bar having anchoring means for receiving a plurality of tethers each coupled to said panels whereby relative movement of the panels to the structural frame is restrained.

5. Fruit harvester according to claim 4 in which the anchor bar has four anchoring means each coupled by a pair of tethers to oppositely disposed panels, and each panel is coupled to the anchor bar by a pair of tethers.

6. Fruit harvester according to claim 4 in which the tethers are elastomers.

7. In a fruit harvester having a fruit removal assembly operatively connected to positioning means for positioning the fruit removal assembly at a desired location adjacent to a fruit tree canopy, the fruit removal assembly having a structural frame coupled to said positioning means, the structural frame supporting two pairs of oppositely disposed panels each mounted eccentrically for relative orbital movement relative to the structural frame and each carrying a plurality of longitudinally extending fingers adapted to penetrate a fruit tree canopy, the improvement in which an anchor bar is coupled to said structural frame and extends longitudinally so as to be equidistant from said pairs of panels, the anchor bar and the panels all lying on one side of said structural frame and the anchor bar having spacing means for spacing the anchor bar from the structural frame by a distance intermediate the distance separating the panels from the structural frame, the anchor bar having anchoring means for receiving a plurality of tethers each coupled to said panels whereby movement of the panels relative to the structural frame is restrained.

8. Fruit harvester according to claim 7 in which the anchor bar has four anchoring means each coupled by a pair of tethers to oppositely disposed panels, and each panel is coupled to the anchor bar by a pair of tethers.

9. Fruit harvester according to claim 7 in which the tethers are elastomers.

* * * * *